(12) United States Patent
White

(10) Patent No.: US 11,047,796 B2
(45) Date of Patent: Jun. 29, 2021

(54) SAMPLING TOOL AND METHOD FOR INFRARED SPECTROSCOPY

(71) Applicant: The Board of Regents of the University of Oklahoma, Norman, OK (US)

(72) Inventor: Robert L. White, Norman, OK (US)

(73) Assignee: The Board of Regents of the University of Oklahoma, Norman, OK (US)

(*) Notice: Subject to any disclaimer, the term of this patent is extended or adjusted under 35 U.S.C. 154(b) by 76 days.

(21) Appl. No.: 16/425,687

(22) Filed: May 29, 2019

(65) Prior Publication Data

US 2019/0369014 A1 Dec. 5, 2019

Related U.S. Application Data

(60) Provisional application No. 62/678,066, filed on May 30, 2018.

(51) Int. Cl.
*G01N 21/3563* (2014.01)
*G01N 21/01* (2006.01)

(52) U.S. Cl.
CPC ......... *G01N 21/3563* (2013.01); *G01N 21/01* (2013.01)

(58) Field of Classification Search
CPC ...... G01N 21/3563; G01N 21/01; G01N 1/36; G01N 21/03; G01N 2021/0339
See application file for complete search history.

(56) References Cited

U.S. PATENT DOCUMENTS

| | | | | |
|---|---|---|---|---|
| 5,470,757 A | * | 11/1995 | Gagnon | B01L 3/508 356/244 |
| 5,519,218 A | * | 5/1996 | Chang | G01N 21/01 250/339.07 |
| 5,723,341 A | | 3/1998 | Truett | |
| 5,764,355 A | * | 6/1998 | Gagnon | G01N 21/01 250/339.07 |
| 6,280,690 B1 | * | 8/2001 | Tadion | G01N 21/3563 356/244 |
| 2004/0251414 A1 | * | 12/2004 | Rodewald | G01N 21/253 250/339.07 |

(Continued)

OTHER PUBLICATIONS

Agilent Technologies; "FTIR Compact & Portable Systems—4300 Handheld FTIR"; Mar. 2014; 6 pages.

(Continued)

*Primary Examiner* — Christine S. Kim
(74) *Attorney, Agent, or Firm* — Conley Rose, P.C.; Grant Rodolph; Jonathan K. Polk

(57) ABSTRACT

A sampling tool for use with an infrared spectrophotometer, and method of use. The sampling tool comprises a bottom plate; and a mesh attached to the bottom plate, the mesh having a plurality of interstitial spaces, and the mesh having a mesh width and a mesh thickness, wherein the mesh is configured to receive a sample material and retain a portion of the sample material within the interstitial spaces of the mesh to form a sample having a sample thickness which is substantially the same as the mesh thickness. The mesh width may be sized to be in a range of about 1 to 3 times the width of an infrared beam directed toward the sampling tool from the spectrophotometer.

20 Claims, 8 Drawing Sheets

(56) References Cited

U.S. PATENT DOCUMENTS

2019/0226910 A1* 7/2019 Messerschmidt ..... G01J 3/0267
2020/0088646 A1* 3/2020 Harris .................. G01N 21/65

OTHER PUBLICATIONS

Agilent Technologies; "Agilent 4300 Handheld FTIR with MCT Detector"; Mar. 2014; 2 pages.
Arno, Josep, et al.; "Advances in Handheld FTIR Chemical Identification for Counter Terrorism and Defence"; 2013; 6 pages.
Litauszki, Greta; "An Investigation into the Role of Portable Attenuated Total Reflectance Fourier Transform Infra red Spectroscopy in the Presumptive Testing of Illicit Drugs"; King's College; London; May 15, 2010; 1 page.
Robertson, A. H. Jean, et al.; "Analysis of Soil in the Field Using Portable FTIR"; International Workshop "Soil Spectroscopy: The Present and Future of Soil Monitoring" FAO HQ; Rome; Dec. 4-6, 2013; 20 pages.
Bruker; "Alpha II FTIR Spectrometers—Technical Details"; Dec. 4, 2013; 5 pages.
Bruker; "Tensor II FTIR Spectrometer—Overview"; Oct. 2015; 4 pages.
U.S. Department of Homeland Security; "Portable Infrared Spectroscopy Chemical Detectors Assessment Report"; Jun. 2016; 36 pages.
Perkinelmer, Inc.; "FT-IR Spectroscopy Attenuated Total Reflectance (ATR)"; Sep. 22, 2004; 5 pages.
Huong Le T. T., et al.; "Rapid Detection of Counterfeit Drugs of Ethambutol Hydrochloride and Cefuroxime Axetil using Handheld Raman, Near Infrared and Portable FTIR Technologies"; Sep. 1, 2014; 14 pages.

\* cited by examiner

SAMPLING TOOL AND METHOD FOR INFRARED SPECTROSCOPY

CROSS-REFERENCE TO RELATED APPLICATIONS

The present application claims priority under 35 U.S.C. § 119(e) to U.S. Ser. No. 62/678,066 filed May 30, 2018, the entirety of which is hereby expressly incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Infrared spectroscopy is the analysis of infrared light interacting with samples. Infrared light is light in the electromagnetic spectrum ranging in wavelength from about 700 nm to about 1 mm and may also be referred to as infrared radiation. When an infrared light strikes a surface of a sample, the infrared light scatters into three portions. A first portion directly reflects off of the sample. A second portion penetrates the sample, undergoes internal reflection in the sample, and then exits the sample. A third portion penetrates the sample and absorbs into the sample. The first portion and the second portion undergo reflectance, or diffuse reflection, and collectively may be referred to as a reflected portion. The third portion undergoes absorbance and may be referred to as an absorbed portion. By determining amounts of the reflected portion as a function of wavelength, one can determine properties of the sample.

When undergoing infrared spectroscopy, many solid samples exhibit excessive absorbance and therefore require dilution in non-absorbing matrices in order to be analyzed. Pelletization and mulling are two approaches to dilution. In pelletization, a test sample material in powder form is mixed with a diluent powder such as salt or metal (e.g., KCl, NaCl, or KBr). The mixture is placed into a die and compressed to form a pellet, which can then be analyzed with a spectrophotometer. However, a non-homogeneous distribution of the sample material within the pellet may cause absorbance spectrum artifacts, and a large particle size in the sample material may make an absorbance appear larger than it is. In mulling, a test sample material in powder form is mixed with a liquid diluent such as a mineral oil, forming a thick suspension called a mull. The mull is placed between KCl or NaCl plates before being placed in the spectrophotometer. However, the diluent may cause an absorbance spectrum to demonstrate features representative of the diluent, which obscure features representative of the sample.

Instead of dilution, one may directly analyze solid samples using infrared microscopes, photoacoustic spectroscopy, or attenuated total reflectance (ATR). However, use of infrared microscopes requires using visible optics to isolate a single particle of a sample and using infrared optics to pass an infrared light with a short path length through the single particle. Photoacoustic spectroscopy requires sealing a sample in a chamber, purging the chamber with an inert gas, directing a modulated infrared light towards the sample, and detecting resulting sound waves with a microphone. Those two approaches therefore require significant preparation, and infrared microscopes are expensive. In ATR, a powder test sample material is placed onto a surface of a high-refractive index crystal and pressed with a clamp into the crystal to form a good contact between the powder and the crystal surface. An infrared light is then directed into the crystal so that the infrared light reflects at a crystal-sample boundary. The quality of resulting spectra depend on how well the sample makes contact with the crystal, and penetration of the infrared light into the sample is wavelength dependent, so spectra relative peak intensities differ from transmission measurements. In addition, the clamp may scratch the crystal, requiring replacement of the crystal, which is a significant cost. It is therefore desirable to overcome the limitations of the approaches above and obtain accurate IR absorbance spectra of samples.

It is apparent that one factor which bears on the quality of the measurements of the sample is the consistency and quality of the sample being tested. It is to improving the consistency and quality of the sample that the present disclosure is directed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
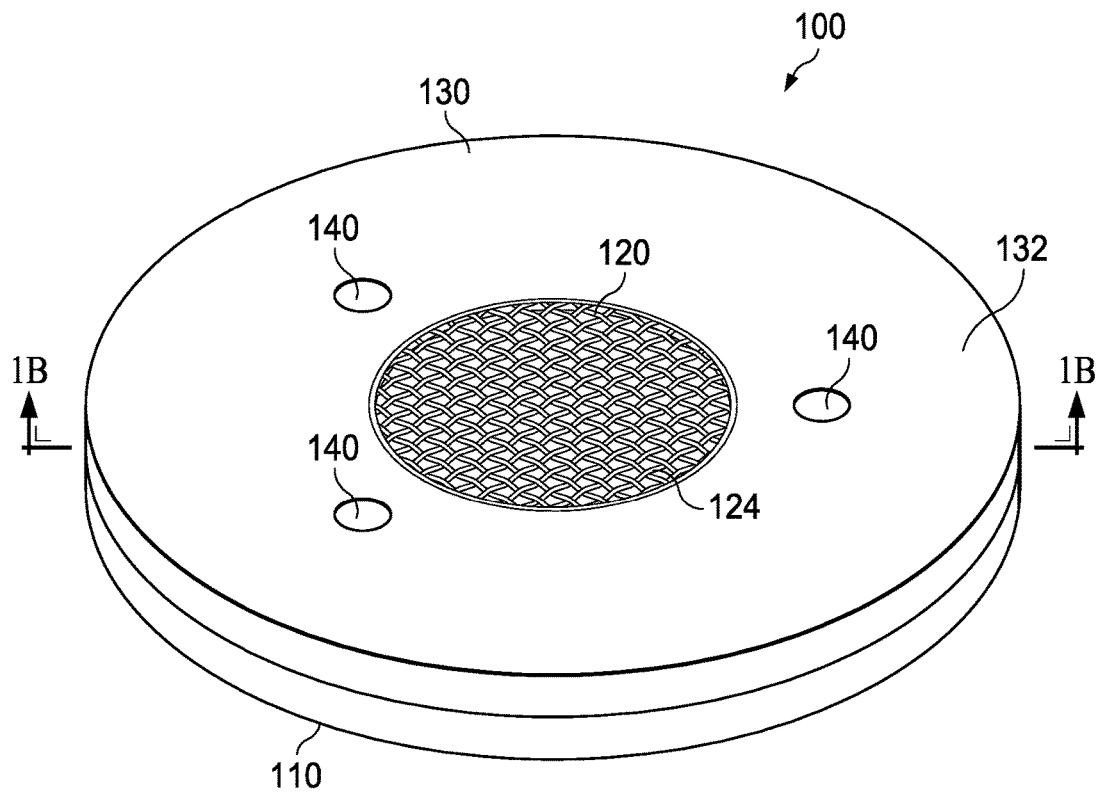
FIG. 1A is a photograph of a sampling tool according to an embodiment of the disclosure.

Disclosed herein are embodiments for a sampling tool and method for infrared spectroscopy. The sampling tool comprises a plate having a mesh attached thereto. When a sample material, such as a powder, is pressed into the mesh and the excess sample material extending above the top of the mesh is scraped off, thereby leveling the sample material in the cavity, a level sample of the material having a consistent height and density is obtained for testing. Additionally, because the mesh is relatively shallow, the resulting sample is thin, providing a shorter path length for infrared light to pass through the sample, thus reducing undesired infrared light absorption and providing a better spectrum. The sampling tool allows for testing neat samples (samples with no diluent), thus eliminating the effects a diluent would have on a measured spectrum. The presently disclosed sampling tool provides for quick and reproducible sample preparation, is relatively cheap and durable, and provides consistent results. The method may be automated, have applications to many industries, and require little operator expertise.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. For example, a reference to a range of 3 mm and 20 mm in diameter, or a range of 50 µm to 300 µm in thickness, is intended to explicitly include all units of measurement in the range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10.

Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
ATR: attenuated total reflectance
CD: compact disc
$cm^{-1}$: inverse centimeter(s)
CPU: central processing unit
DSP: digital signal processor
DVD: digital video disc
EO: electrical-to-optical
FPGA: field-programmable gate array
IR: infrared
mm: millimeter(s)
nm: nanometer(s)
OE: optical-to-electrical
RAM: random-access memory
RF: radio frequency
ROM: read-only memory
RX: receiver unit
SRAM: static RAM
TCAM: ternary content-addressable memory
TX: transmitter unit
µm: micrometer(s).

Referring now to the drawings, FIGS. 1A-D show a sampling tool 100 according to one non-limiting embodiment of the disclosure. As shown in FIG. 1A, the sampling tool 100 comprises a bottom plate 110, a mesh 120, a bonding material 130 which attaches, bonds, or adheres the mesh 120 to the bottom plate 110, and a plurality of optional fastening holes 140. The bottom plate 110 may be stainless steel sheet metal or any suitable metal such as a non-corrosive metal such as nickel or chromium, or any other non-corrosive material described herein. The bottom plate 110 may be round (or have any other suitable shape); have a diameter, width, or length in a range of about 3 mm to about 40 mm (in non-limiting embodiments), and may have a thickness in a range of about 100 µm to about 2,000 µm (in non-limiting embodiments). For instance, the bottom plate 110 has a diameter of about 20 mm and a thickness in a range of about 300 µm to about 500 µm. The sampling tool 100 is also shown in the center of FIG. 2A.

The fastening holes 140 allow fasteners (e.g., screws) to pass through in order to secure the sampling tool 100 to another apparatus such as a sampling tool holder, which is described below. In non-limiting embodiments, the fastening holes 140 may have a diameter in a range of about 0.5 mm to about 4 mm. A stamp may form the fastening holes 140 by stamping the fastening holes 140 into the base 110. Though three fastening holes 140 are shown, there may be more or less fastening holes, or fastening holes may be absent in certain embodiments (e.g., see FIG. 3). In embodiments of the sampling tool 100 which do not include fastening holes, the sampling tool may be attached to a sampling tool holder or to a sampling tool carrier by other suitable fasteners, such as clips, posts, studs, bolts, magnets, or other means known in the art for fastening, securing, or holding two structures together.

Figure 1B:
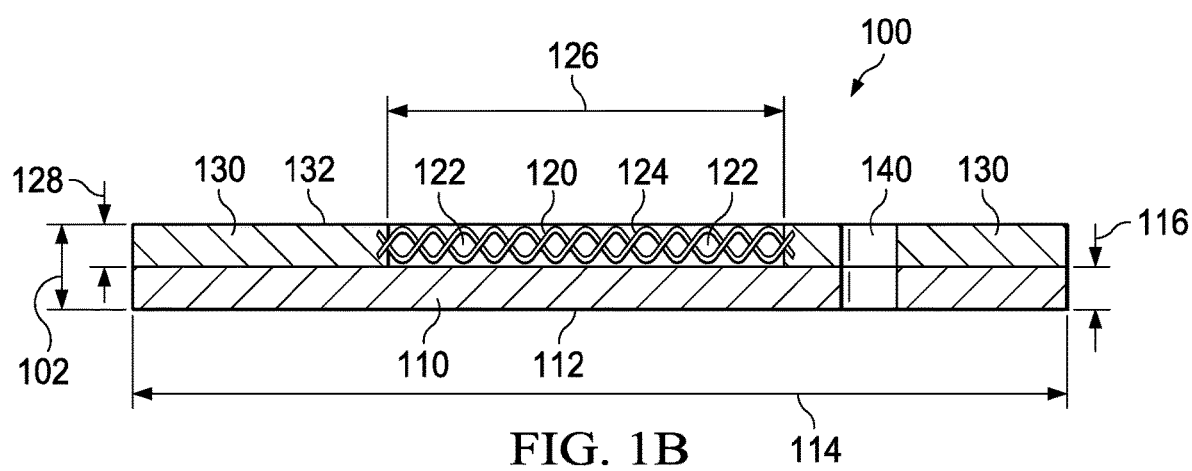
FIG. 1B is a cross-sectional schematic view taken through the sampling tool of FIG. 1A, with the cross-section taken through a mesh in the sampling tool.
Figure 2A:
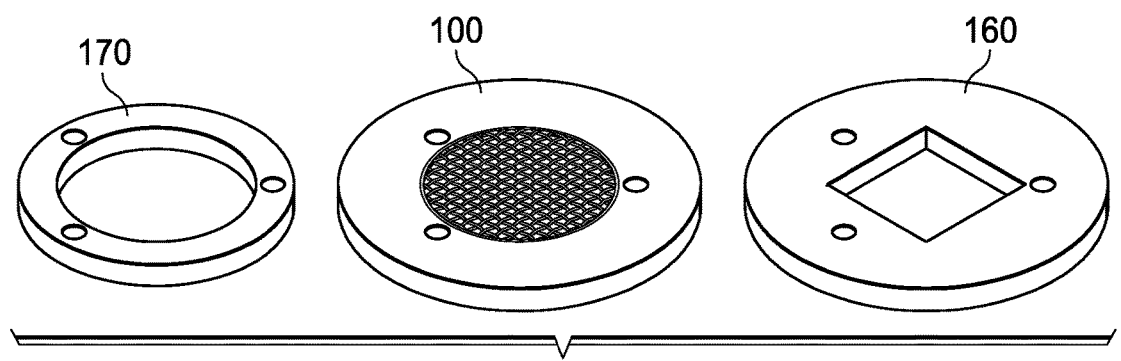
FIG. 2A is a photograph of sampling tool components of a sampling tool assembly according to an embodiment of the disclosure.

FIG. 1B shows a side cross-sectional view of the sampling tool 100 having a thickness 102. As shown in FIG. 1B, the bottom plate 110 has a lower surface 112, a plate diameter 114, and a thickness 116. The mesh 120 has a plurality of interstitial spaces 122, an upper surface 124, a diameter 126, and a mesh thickness 128. The bonding material 130 has an upper surface 132, and the fastening holes 140 extend from the upper surface 124 through the lower surface 112. The mesh 120 is securely positioned by the bonding material 130, which may be for example, a welded solder material or other permanent securing means such as super glue or epoxy resin. In the non-limiting example shown in FIG. 1A, the sampling tool 100 is formed by applying the mesh 120 to a top surface of the bottom plate 110 and welding (e.g., soldering) the mesh 120 thereto.

In certain embodiments, such as shown in FIG. 1A, the mesh 120 comprises a plurality of interlocking wires. Gaps between the wires form the interstitial spaces 122. When a sample material to be tested, such as a powder, is pressed into the mesh 120, the sample material fills the interstitial spaces 122 of the mesh 120 and is retained therein. Excess sample material which extends above the upper surface 124 of the mesh 120, is removed by scraping, forming a level sample 150 of the sample material which is retained within the interstitial spaces 122 of the mesh 120 (FIG. 1C) and has a thickness which is approximately the thickness of the mesh 120 (i.e., mesh thickness 128). The sample 150 on the sampling tool 100 is then ready for testing.

As noted, in non-limiting embodiments, the mesh 120 may comprise a wire mesh having a mesh diameter 126 in a range of about 3 mm to about 40 mm and have a mesh thickness 128 in a range of about 50 µm to about 300 µm. A minimum mesh diameter 126 may be a diameter of an infrared light beam directed towards a sample in the mesh 130. Advantageously, the mesh diameter 126 may be larger than the infrared light beam, for example about 1 to about 3 times larger, to more easily align the sample with the infrared light. For example, the width of the infrared beam may be in a range of about 1 mm to about 13 mm. More particularly, the width of the infrared beam may be in a range of about 1.5 mm to about 7 mm. Thus, in non-limiting embodiments, the mesh diameter 126 may be in a range of about 1 mm to 39 mm, and more particularly in a range of about 4.5 mm to about 21 mm.

The mesh thickness 128 determines a thickness of the sample 150 and is configured to provide for suitable infrared spectroscopy of the sample 150. Thus, the mesh thickness 128 limits a path length of infrared light through the sample 150 in order to limit absorbance of the infrared light within the sample 150 and provide a more accurate absorbance spectrum. The wire, which comprises the mesh 120, may be stainless steel, form a mesh weave structure to create the interstitial spaces (voids) 122 for receiving and retaining the sample, and have a wire diameter in a range of about 25 µm to about 150 µm. Due to the interwoven structure of the mesh 120, the mesh thickness 128 is about twice the wire diameter. As a result, the sample 150 has a thickness, which is about twice the diameter of the wire that forms the mesh 120, i.e., about twice the mesh thickness 128.

In one non-limiting example, the mesh diameter 126 is about 9 mm to about 10 mm and comprises a mesh of stainless steel wire having a wire diameter of about 110 µm, providing the mesh 120 with a mesh thickness 128 of about 220 µm. Similarly, the sample 150 within the interstitial spaces 122 of the mesh 120 has a thickness of about 220 µm. The bottom plate 110 has a plate diameter 114 of about 20 mm and a plate thickness 116 of about 300 µm, the bonding material 130 has a maximum thickness of about 220 µm, providing a total thickness of the sampling tool 100 of about 520 µm. The components of the sampling tool 100 may have other suitable compositions, shapes, and sizes. For instance, the mesh 120 may comprise a polymer, a non-woven fiber, or another suitable material.

Figure 1C:
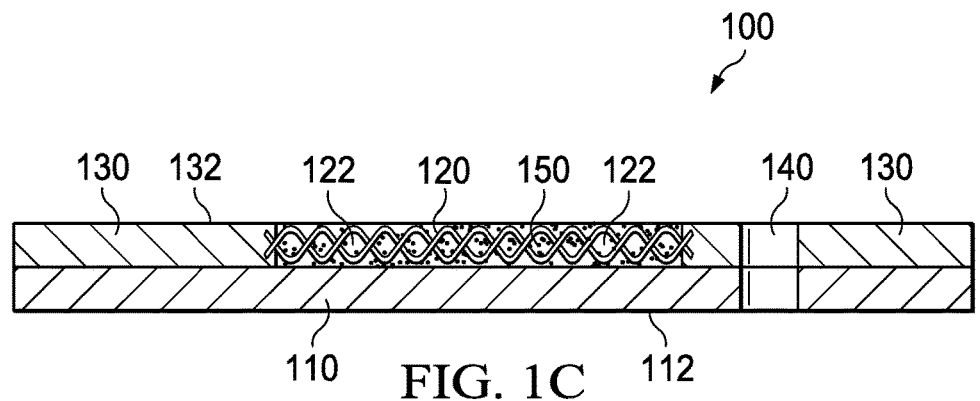
FIG. 1C is a cross-sectional schematic view taken through the sampling tool of FIG. 1A after a sample material has been introduced into the mesh.
Figure 1D:
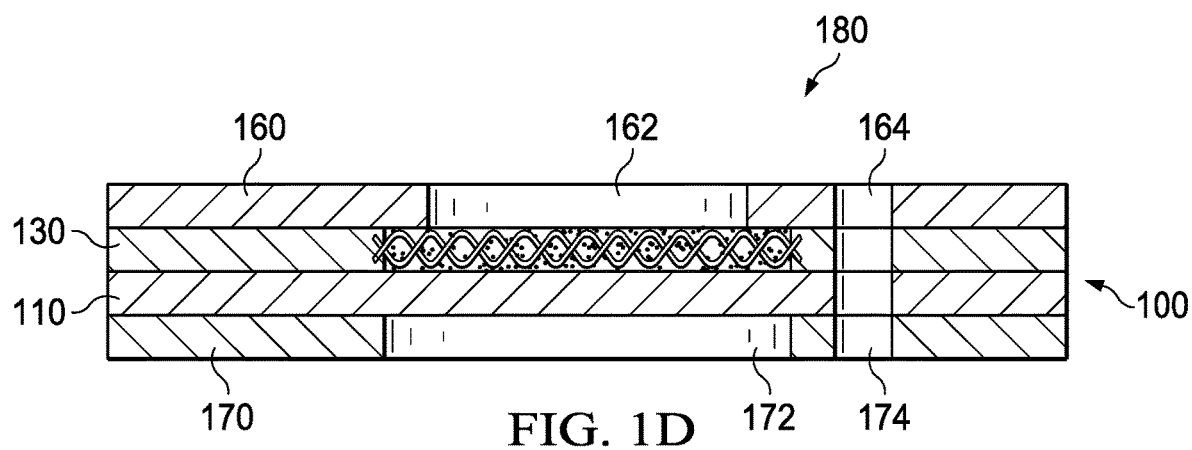
FIG. 1D is a cross-sectional schematic view taken through the sampling tool of FIG. 1A after the sampling too has been sandwiched between a top cover plate and a support ring.
Figure 2B:
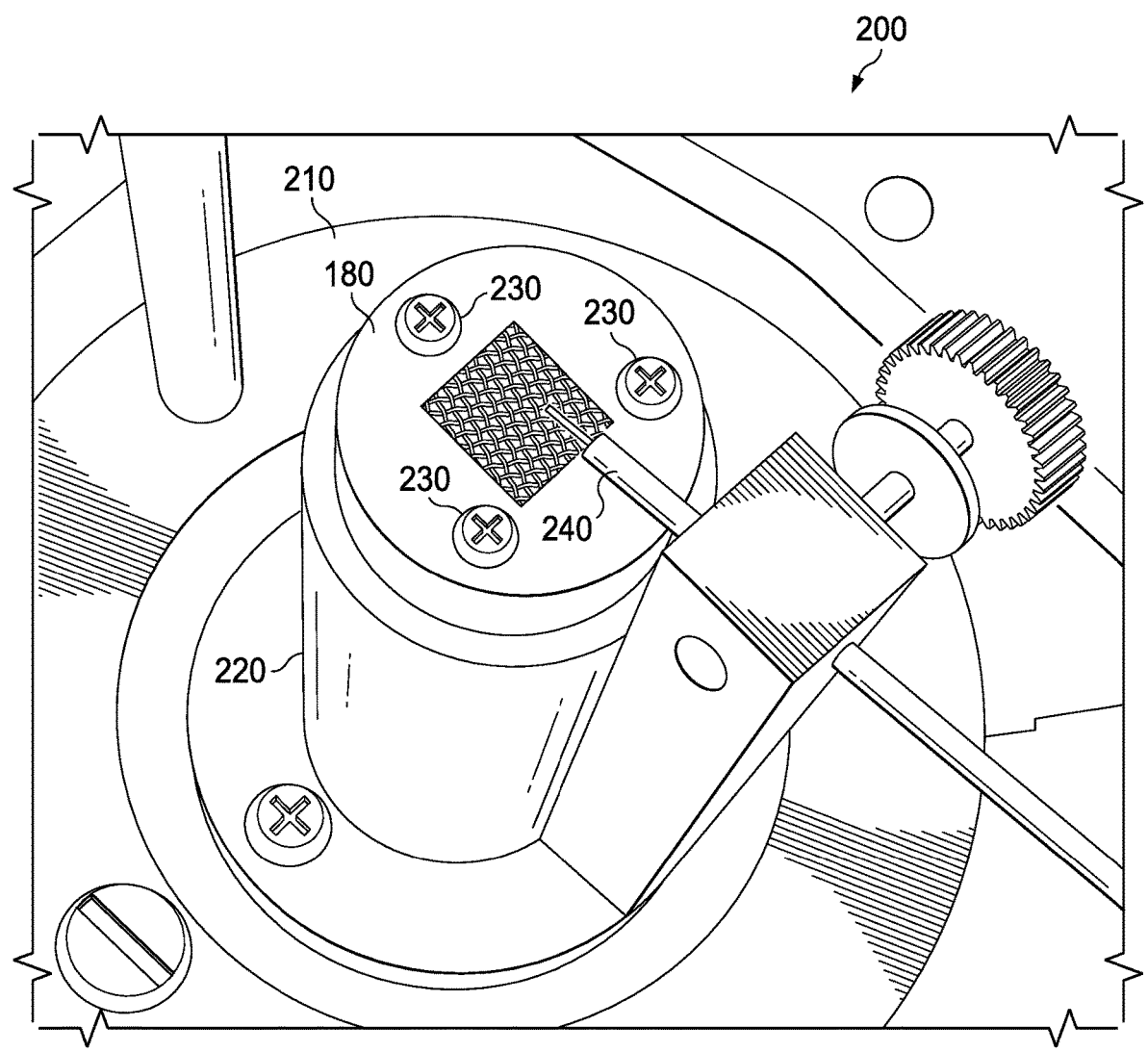
FIG. 2B is a photograph of the sampling tool components of FIG. 2A assembled into a sampling tool assembly and fastened upon a sampling tool holder according to an embodiment of the disclosure.

For further sample preparation and testing, as discussed in further detail below, in regard to FIGS. 2A and 2B, the sampling tool 100 may be covered with a top cover plate 160, as indicated in FIG. 1D and FIG. 2A. The top cover plate 160 fits over the upper surface 132 of the sampling tool 100 and has fastening holes 164, which are aligned with the fastening holes 140 in the sampling tool 100. The top cover plate 160 has an opening 162, which is positioned over the mesh 120. The shape of the opening 162 may be round, square, or any shape suitable for use with the sampling tool 100 to allow adequate IR irradiation of the sample 150. Below the sampling tool 100 may be positioned an alignment ring 170 (see FIG. 1D and FIG. 2A) for supporting and aligning the sampling tool 100 on a sampling tool holder 220 (FIG. 2B). The alignment ring 170 has a central opening 172 and fastening holes 174, which are aligned with the fastening holes 140 in the sampling tool 100 and fastening holes 164 in the top cover plate 160. Arranged together, the top cover plate 160, the sampling tool 100, and the alignment ring 170 form a sampling tool assembly 180 (FIG. 2B), which is ready to mounted on the sampling tool holder 220 for spectrophotometry testing of a sample material. Generally, the top cover plate 160 and support ring 170 are constructed of the same material (e.g., stainless steel) as the sampling tool 100.

FIG. 2B illustrates a non-limiting embodiment of a spectrophotometer sampling tool holder system 200 according to an embodiment of the disclosure. The sampling tool holder system 200 comprises a base 210 and a sampling tool holder 220. The sampling tool assembly 180 is positioned upon the sampling tool holder 220 and is secured thereto by fasteners 230, which are inserted into the aligned fastening holes 140, 164, and 174. A thermocouple 240 can be optionally positioned upon the sample 150, which is positioned in the mesh 120, which is visible through the opening 162 in the top cover plate 160. The sample 150 is then ready for irradiation by the spectrophotometer. The components of the sampling holder system 200 may be part of a stand-alone system or may be a combination of separate such systems.

The base 210 comprises a structure for mounting the sampling tool holder 220 and may comprise a heater for heating the sample 150 during the infrared testing procedure, when desired. The sampling tool holder 220 comprises holes (not shown) that match the fastening holes 140, 164, and 174 of the sampling tool assembly 180 and accept the fasteners 230. The fastening holes of the sampling tool holder 220 may comprise metal threads. The fasteners 230 pass through the fastening holes 140, 164 and 174 and secure into the holes of the sampling tool holder 220. The fasteners 230 may be metal screws. The thermocouple 240 measures the temperature of the sample 150 when it is heated during infrared spectroscopy. The base 210, the sampling tool holder 220, and the fasteners 230 may have other suitable compositions, shapes, and sizes.

The arrangement shown in FIG. 2B is for testing samples in variable temperature sample studies. Thus, sampling tool assembly 180 can be heated and simultaneously positioned at the diffuse reflection optics focal point of the spectrophotometer. In the sampling tool holder 220, a cartridge heater (not shown) is contained inside a quartz tube (not shown) and air is brought in at the bottom of the quartz tube to force hot air out through the top. The sampling tool assembly 180 is placed over the quartz tube so that the sample 150 can be heated by the hot air. The sampling tool assembly 180 facilitates efficient heating and alignment of the sample 150 with the optics.

In the testing process, the sample material is pressed into the mesh 120 of the sampling tool 100, which is sandwiched between the alignment ring 170 and the top cover plate 160. The alignment ring 170 allows the sampling tool 100 to be positioned over the quartz tube so the underside of the sample 150 is in line with the center of the quartz tube. Because the quartz tube is fixed to a mounting stand, the alignment ring 170 also positions the sample 150 so that it is at the focal point of the diffuse reflection optics. The opening 162 in the top cover plate 160 is larger than the infrared beam. Therefore, the sample 150 is guaranteed to fill the infrared beam area if the entire space below the opening 162 is filled. In one embodiment, the opening 162 has a square shape that allows convenient use of a rectangular knife edge to level the sample material by repeated scraping back and forth, thereby forming the sample 150.

Examples of spectrophotometers are well known in the art, thus a detailed description of their construction is not considered necessary herein. Briefly however, a spectrophotometer comprises a light source, optics, and a detector. The light source generates a light wavelength such as an infrared light wavelength. The optics comprise mirrors that direct the infrared light towards the sample and direct reflected infrared light reflected from the sample towards the detector. The detector measures an amount of the reflected infrared light and provides the amount for further processing. The spectrophotometer may comprise the base 210 and the sampling tool holder 220, or may be separate therefrom.

Figure 3A:
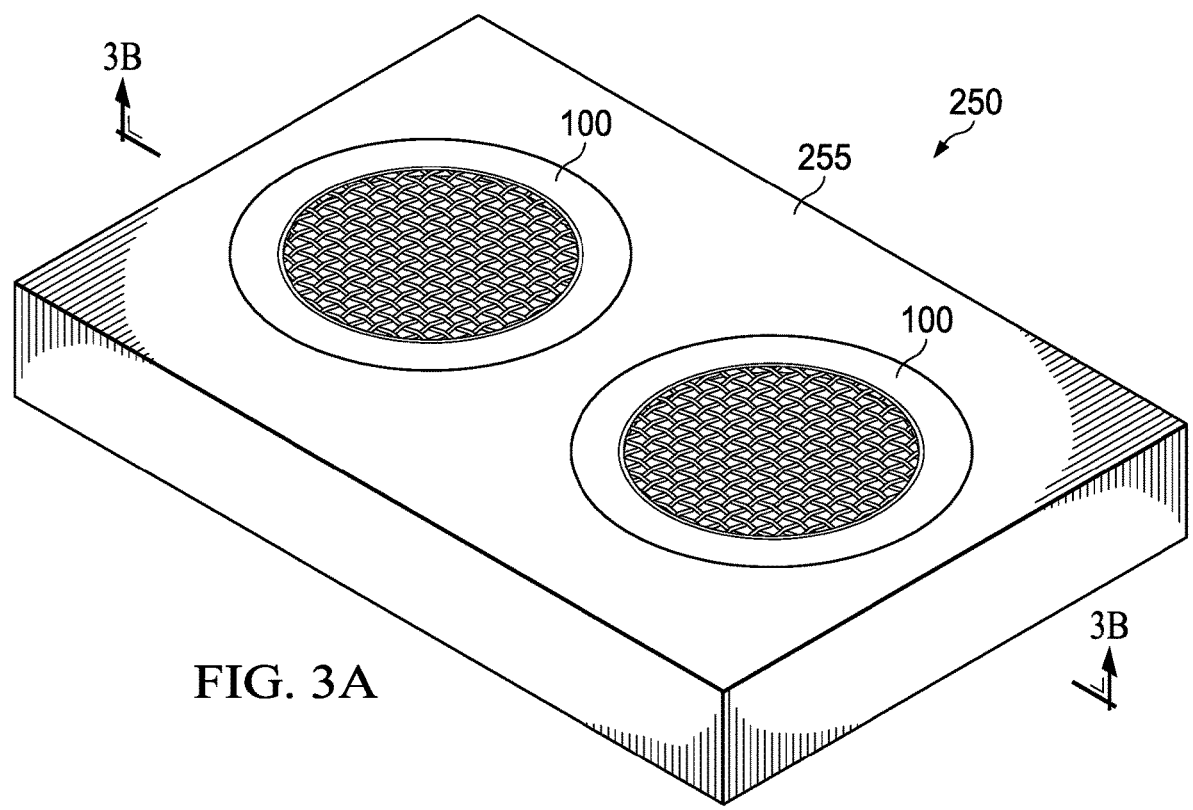
FIG. 3A is a schematic diagram showing a perspective view of an alternate embodiment of a sampling tool holder of the present disclosure.
Figure 3B:
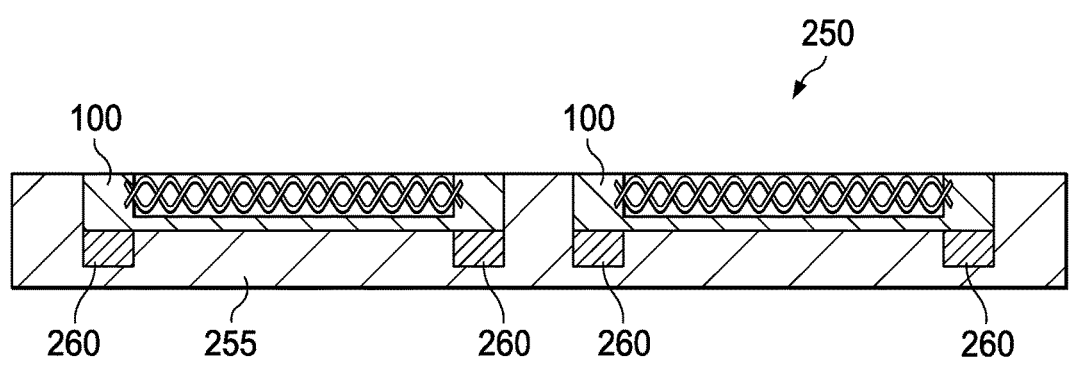
FIG. 3B is a schematic diagram showing a cross-sectional view taken through line B-B' of FIG. 3A.

Shown in FIG. 3A-B is an alternate embodiment of a sampling tool carrier, designated by reference numeral 250, upon which a pair of sampling tools 100 (each of which is absent a fastening hole) can be mounted for analysis by a spectrophotometer as disclosed herein. The sampling tool carrier 250 comprises a plate 255, which is constructed of a material such as stainless steel, aluminum, or any other suitable material, such as for example, metal, ceramic, plastic, polymer, thermoplastic, or glass. The sampling tool carrier 250 may be resistant to corrosion. The plate 255 comprises one, two, or more cavities into which the sampling tool 100 can be inserted (two cavities are shown in FIG. 3A). When the sampling tool 100 is made out of a ferrous or magnetic material, the plate 255 may comprise one or more magnets 260 for holding the one or more sampling tools 100 in the cavities of the plate 255. Other holders or fasteners could be used instead of the magnets 260. Or each sampling tool 100 could be held within the cavity by friction or a low-tack adhesive, for example. The sampling tool carrier 250 could then be inserted into a spectrophotometer for IR analysis of the sample 150 in the sampling tool 100 at ambient (non-heated) temperatures. In one embodiment, the sampling tool carrier 250 loaded with the sampling tools 100 could be inserted into a slot in a spectrophotometer, or onto a rail, or loaded onto a drawer (such as a CD/DVD player drawer) or a "coin slot" which can be manually or automatically inserted into and retracted from a spectrophotometer. A button or touch pad could then be pushed to initiate an analysis.

In one non-limiting embodiment, the sampling tool carrier 250 could carry two or more sampling tools 100 so that multiple samples 150 can be analyzed in succession. The sampling tool carrier 250 is moved so that a first sampling tool 100 with a sample 150 is positioned at the point of irradiation/measurement position and a diffuse reflection measurement is taken of that sample. Then the sampling tool carrier 250 is moved so the second sampling tool 100 thereon is moved into the irradiation/measurement position and a diffuse reflection measurement is taken of that sample.

Figure 4:
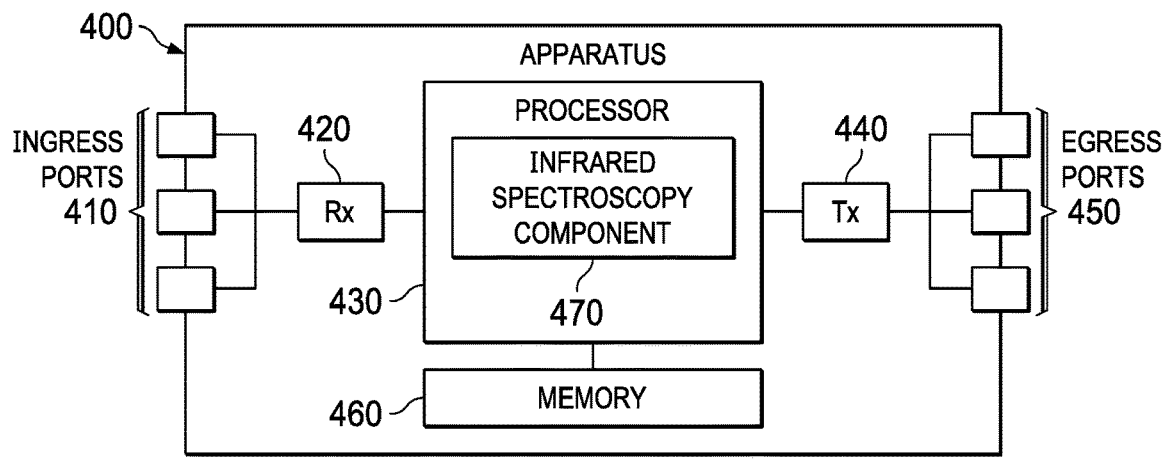
FIG. 4 is a schematic diagram of an apparatus according to an embodiment of the disclosure.

FIG. 4 is a schematic diagram of an apparatus 400 according to an embodiment of the disclosure. The apparatus 400 may implement the disclosed embodiments as described below. Along with components of the sampling tool holder 200, the apparatus 400 may form part or all of an infrared spectrophotometer. The apparatus 400 comprises ingress ports 410 and an RX 420 for receiving data; a processor, logic unit, baseband unit, or CPU 430 to process the data; a TX 440 and egress ports 450 for transmitting the data; and a memory 460 for storing the data. The apparatus 400 may also comprise OE components, EO components, or RF components coupled to the ingress ports 410, the RX 420, the TX 440, and the egress ports 450 for ingress or egress of optical, electrical signals, or RF signals.

The processor 430 is any combination of hardware, middleware, firmware, or software. The processor 430 comprises any combination of one or more CPU chips, cores, FPGAs, ASICs, or DSPs. The processor 430 communicates with the ingress ports 410, the RX 420, the TX 440, the egress ports 450, and the memory 460. The processor 430 comprises an infrared spectroscopy component 470, which implements the disclosed embodiments as described below. The inclusion of the infrared spectroscopy component 470 therefore provides a substantial improvement to the functionality of the apparatus 400 and effects a transformation of the apparatus 400 to a different state. Alternatively, the memory 460 stores the infrared spectroscopy component 470 as instructions, and the processor 430 executes those instructions.

The memory 460 comprises any combination of disks, tape drives, or solid-state drives. The apparatus 400 may use the memory 460 as an over-flow data storage device to store programs when the apparatus 400 selects those programs for execution and to store instructions and data that the apparatus 400 reads during execution of those programs. The memory 460 may be volatile or non-volatile and may be any combination of ROM, RAM, TCAM, or SRAM. The apparatus 400 may further comprise a display for displaying data and receiving input from a user, or the apparatus 300 may be communicatively coupled to such a display.

Figure 5:
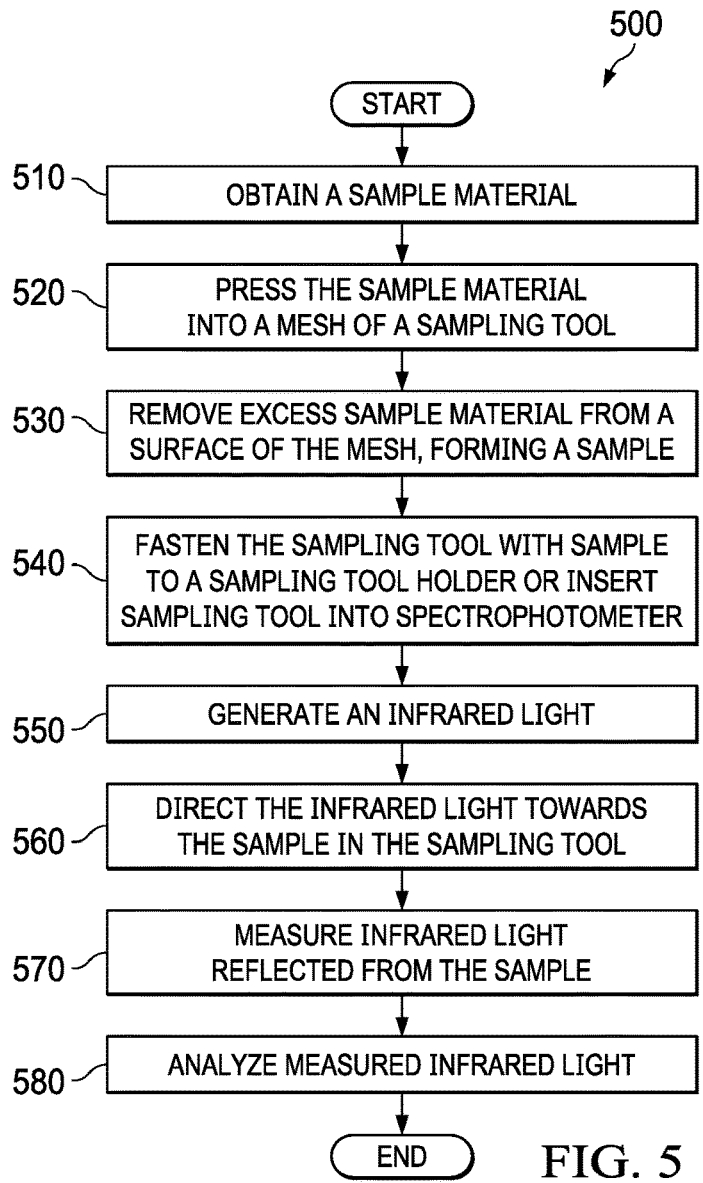
FIG. 5 is a flowchart illustrating a method of infrared spectroscopy according to an embodiment of the disclosure.

FIG. 5 is a flowchart illustrating a method 500 of infrared spectroscopy according to an embodiment of the disclosure. At step 510, a sample material to be tested is obtained by a human operator. For example, the sample material may be a pharmaceutical drug or a material whose identity is unknown to the operator. Generally the sample material is obtained in neat form, that is, it is not mixed with a diluent material. In certain alternate embodiments, the sample material can be combined with a diluent if desired. At step 520, the sample material is deposited upon the mesh 120 of the sampling tool 100 so the sample material fills the interstitial space 122 of the mesh 120. The sample material is then pressed into the interstitial space 122. At step 530, excess sample material is removed from the upper surface 124 of the mesh 120. For instance, the operator removes, levels, or knifes off, excess sample material by moving a metal scraper across the upper surface 124 of the mesh 120, forming the sample 150 having a consistent thickness (FIG. 1C). At step 540, the sampling tool with the sample 150 can be fastened to a sampling tool holder. For instance, the operator places the sampling tool 100 on top of the sampling tool holder 220 in FIG. 2, lines up the fastener holes 140 of the sampling tool 100 with the fastener holes of the sampling tool holder 220, passes the fasteners 230 through the fastener holes 140, and secures the fasteners 230 into the fastener holes of the sampling tool holder 220. Alternatively, before step 510, the sampling tool 100 forms a portion of a sampling tool assembly 180 such as shown in FIG. 2B. Alternately, the sampling tool 100 could be placed in a sampling tool carrier 250 as shown in FIG. 3A for insertion into a spectrophotometer adapted for such use.

At step 550, an infrared light is generated. For instance, the light source in the spectrophotometer generates the infrared light. At step 560, the infrared light is directed towards the sample 150 on the sampling tool 100, for instance, via the optics in the spectrophotometer. Upon doing so, the infrared light scatters to create a reflected portion and an absorbed portion. Infrared light that contacts the mesh 120 reflects off of the mesh 120 as part of the reflected portion, so the mesh 120 has little or no effect on absorbance characteristics of the sample 150. At step 570, reflected infrared light is measured. For instance, the detector in the spectrophotometer measures an amount of the reflected portion.

Finally, at step 580, properties of the sample are determined based on the reflected infrared light. For instance, the apparatus 400 in FIG. 4 calculates a reflectance R of the sample as follows:

$$R = I/I_o. \qquad (1)$$

I is an intensity of an infrared light reflected from the sample at a selected wavelength, and $I_o$ is an intensity of an infrared light reflected from a totally reflecting material at the wavelength. The totally reflecting material may be a salt or a metal powder. R comprises two components as follows:

$$R=R_1+R_2. \qquad(2)$$

$R_1$ is a first reflectance indicating a first amount of a first portion of the infrared light that directly reflects off of the sample, and $R_2$ is a second reflectance indicating a second amount of a second portion of the infrared light that penetrates the sample, undergoes internal reflection in the sample, and then exits the sample. $R_2$ reduces when the sample absorbs the infrared light at the wavelength. The apparatus 400 then calculates a reflectance spectrum by determining R across a wavelength spectrum. The operator or the apparatus 400 may compare the reflectance spectrum, which may be referred to as a calculated spectrum, to reference spectra to determine whether the sample 150 is a particular material. The reference spectra may be available in known spectra libraries.

In certain non-limiting embodiments, the method 500 may take less than one minute. After completion of the method 500, the operator may clean the mesh 120 by brushing it with a mixture of soap and water and then drying it with compressed air. If particles of the sample 150 are stuck in the mesh 120, then the operator may use an ultrasonic cleaner to remove those particles.

The apparatus 400, and specifically the infrared spectroscopy component 470, may automate some or all of the method 500. For instance, the apparatus 400 may instruct a carousel, moving belt, or other machine to perform steps 510, 520, 530. For step 540, sampling tools may already be fastened to sampling holders. The apparatus 400 may instruct the spectrophotometer to perform steps 550, 560, 570. Finally, the apparatus 400 performs step 580. Alternatively, an operator manually performs some or all of the method 500.

Automation may be tailored for commercial ease. For instance, the sampling tool 100 could be constructed as a single-use or multiple-use card comprising the mesh 120. The card could have a rectangular shape, circular shape, or any other suitable shape. An operator could insert the card having the sample 150 into a slot in a spectrophotometer or load the card onto a drawer (such as a CD/DVD player drawer) or "coin slot" which can be manually or automatically inserted into and retracted from a spectrophotometer. A button or touch pad could then be pushed to initiate an analysis, after which a result of the analysis is viewed on a screen of the machine or otherwise output for viewing or interpretation. A slot may hold the card, or the slot may allow the card to fall or otherwise move into another location in the machine. The analysis may compare a calculated spectrum of the sample to spectra in a library, indicate if the comparison yields no match, and indicate a matching material if the comparison yields a match. The method 500 may be used at airports, shipping docks, borders, or other suitable locations to test for the presence of drugs and explosives; in the pharmaceutical industry to test drug authenticity or quality; in the chemical industry to monitor manufacturing processes; and in law enforcement agencies to test crime scene evidence.

Figure 6:
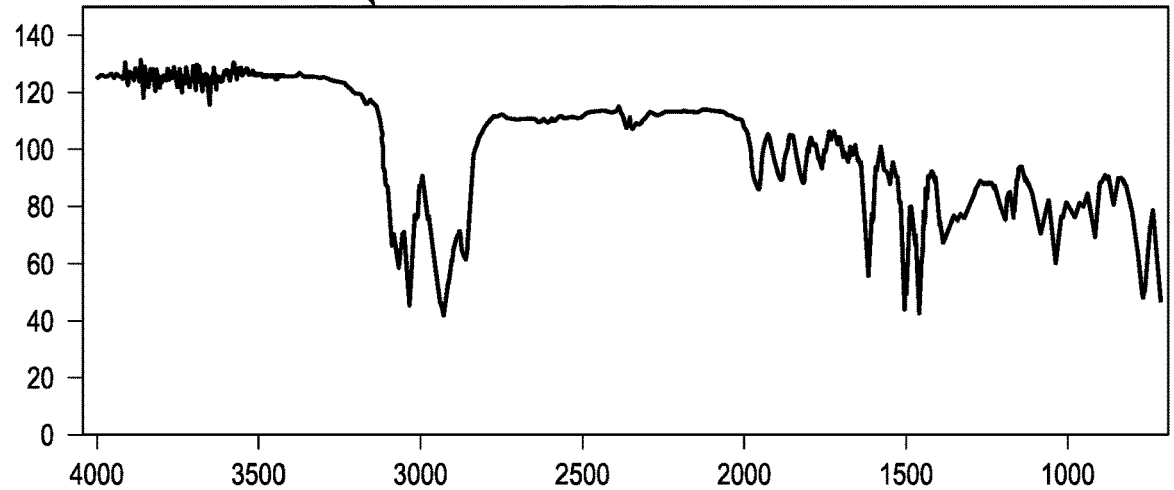
FIG. 6 shows infrared spectra of polystyrene resulting from various sample preparation methods using a sampling tool of the present disclosure.
Figure 6:
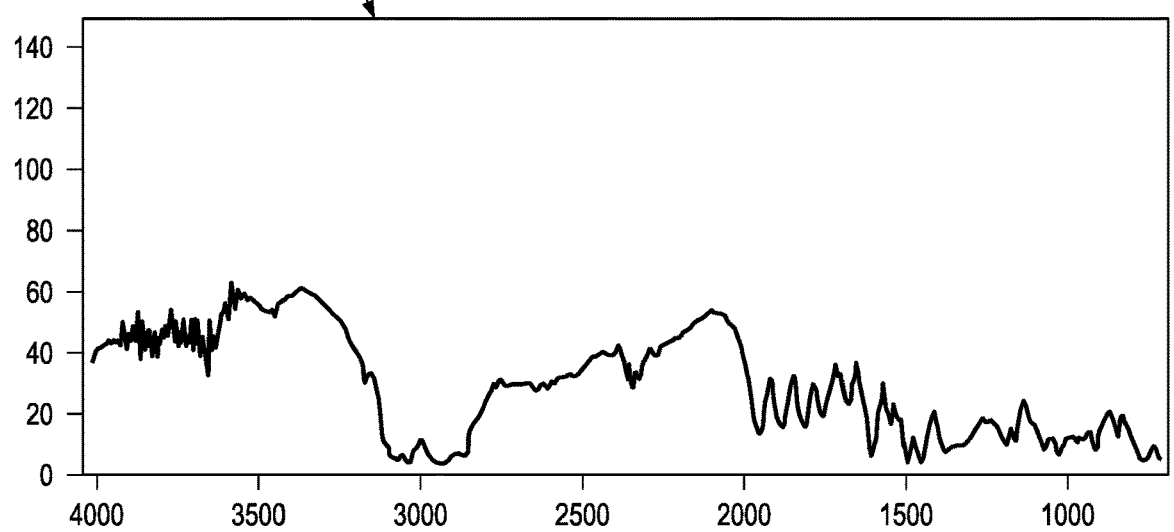
Figure 6:
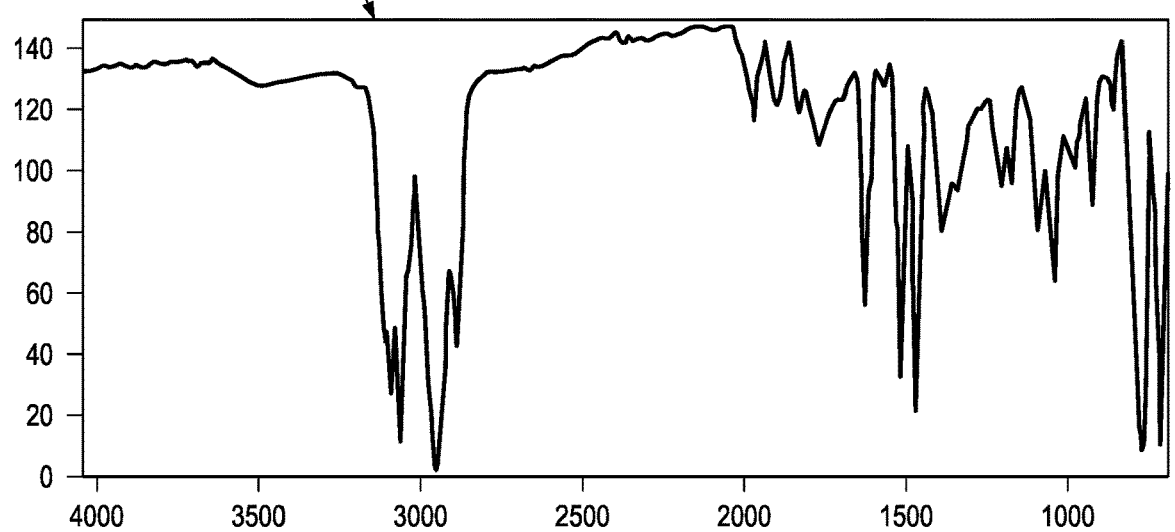

FIG. 6 compares reflectance spectra of polystyrene resulting from various sample preparation methods. FIG. 6 comprises graphs 610, 620, 630 with x-axes representing wavelength in $cm^{-1}$ and y-axes representing reflectance R. The graph 610 is a reflectance spectrum of a polystyrene powder using the method 500 and thus a sample with a thickness of about 220 μm, the graph 620 is a reflectance spectrum of a polystyrene powder using a method that produces a sample with a thickness of about 500 μm, and the graph 630 is a reference transmission spectrum of a clear polystyrene film.

Both the graph 610 and the graph 620 demonstrate noise above wavelengths of about 3,500 $cm^{-1}$ due to fluctuations in atmospheric water concentrations. Purging the spectrophotometer with dry air could remove that noise. The graph 610 comprises spectral peaks that are similar to the spectral peaks in the graph 630, while the graph 620 comprises spectral peaks that are broader than the spectral peaks in the graph 630 and the graphs 620 comprises relative intensities that are distorted compared to the graph 630. In addition, the graph 620 shows almost zero reflectance in some wavelength ranges, making it difficult to detect subtle changes in the structure of the sample. Thus, compared to the graph 620, the graph 610 provides a reflectance spectrum that is closer to the reference transmission spectrum and that better represents the structure of the sample.

Figure 7:
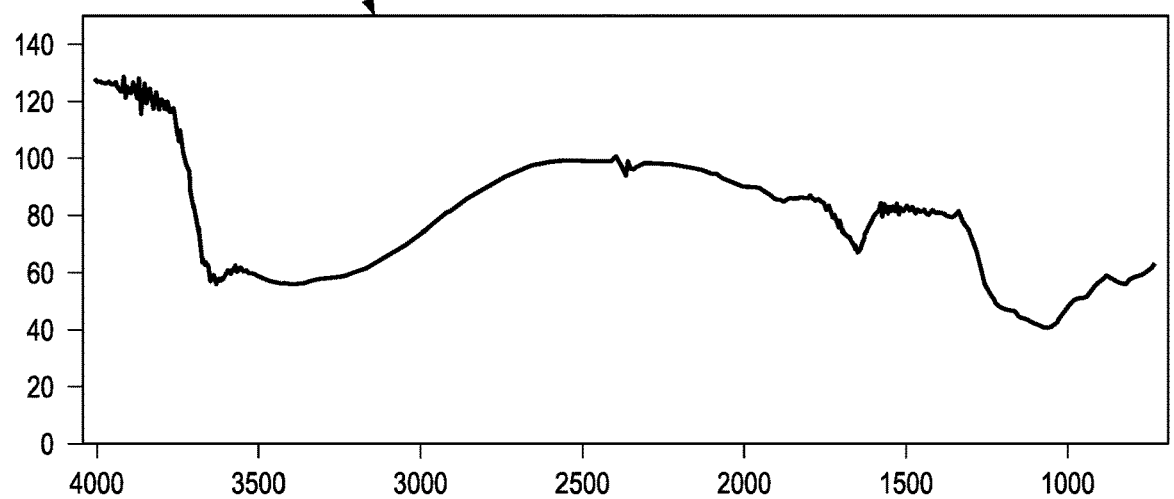
FIG. 7 shows reflectance spectra of montmorillonite clay resulting from various sample preparation methods using a sampling tool of the present disclosure.
Figure 7:
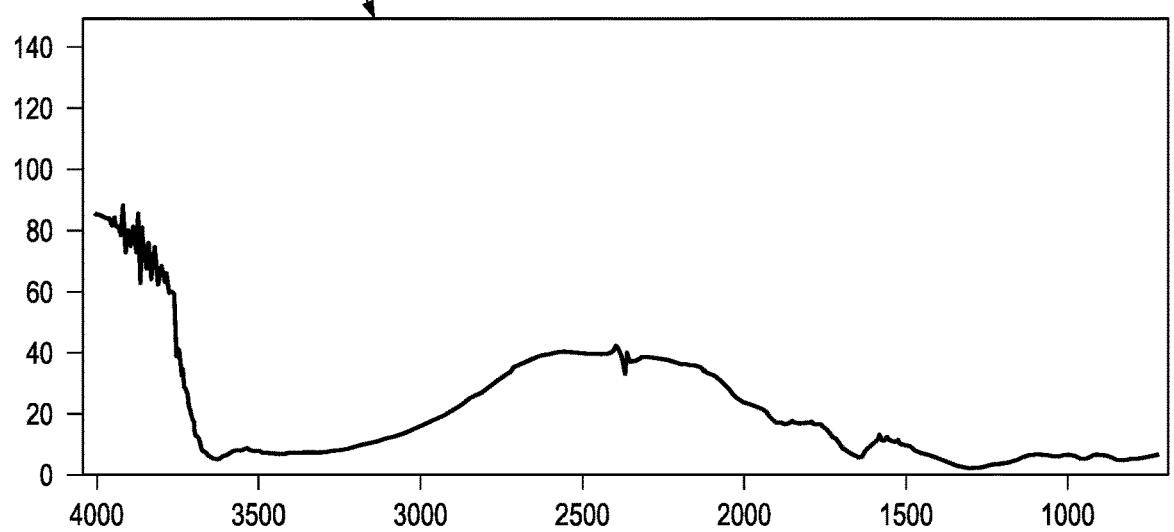
Figure 7:
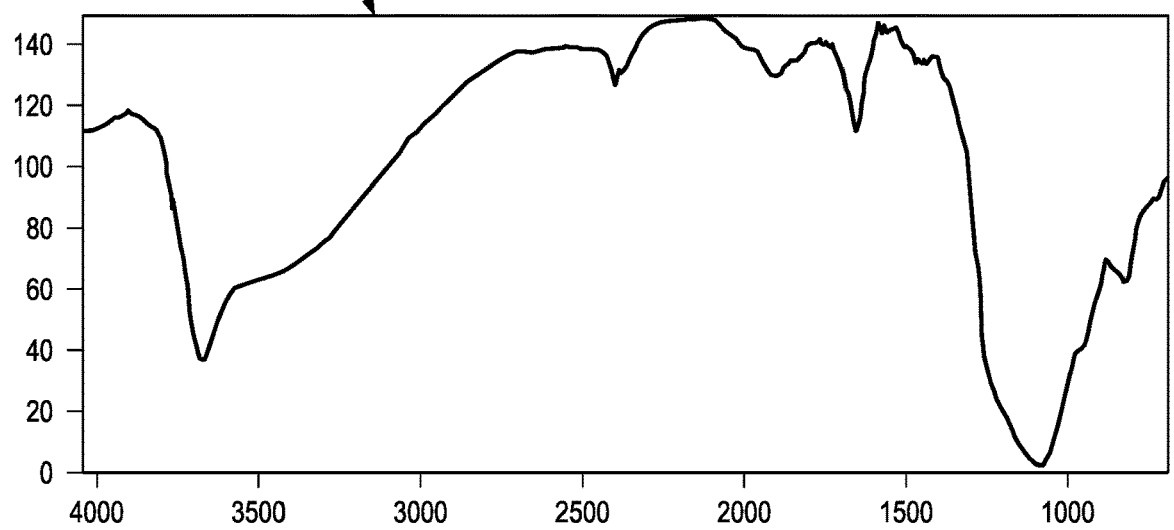

FIG. 7 compares reflectance spectra of montmorillonite clay resulting from various sample preparation methods. FIG. 7 comprises graphs 710, 720, 730 with x-axes representing wavelength in $cm^{-1}$ and y-axes representing reflectance R. The graph 710 is a reflectance spectrum of a montmorillonite clay powder using the method 500 and thus a sample with a thickness of about 220 μm, the graph 720 is a reflectance spectrum of a montmorillonite clay powder using a method that produces a sample with a thickness of about 500 μm, and the graph 730 is a reference reflectance spectrum of a diluted montmorillonite clay powder as a reference. For the graph 730, a silver powder diluent provides a 1:10 dilution of the montmorillonite clay.

Both the graph 710 and the graph 720 demonstrate noise above wavelengths of about 3,750 $cm^{-1}$ due to fluctuations in atmospheric water concentrations. Purging the instrument with dry air could remove that noise. In the graph 720, peaks in a region of wavelengths below about 1,500 $cm^{-1}$ are not easily discernable, so the graph 720 is not useful in that region. Compared to the graph 710, a broad band in a region of wavelengths above about 3,000 $cm^{-1}$ is narrower, indicating the diluent changed properties of the montmorillonite clay. Thus, the graph 710 provides the most useful and most accurate data among the graphs 710, 720, 730.

Figure 8:
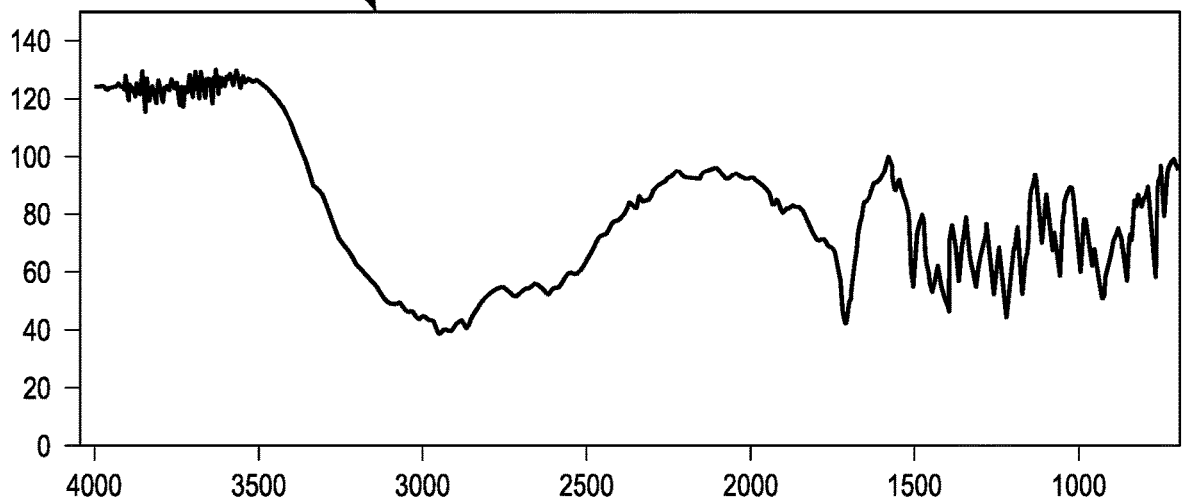
FIG. 8 shows infrared spectra of ibuprofen resulting from various sample preparation methods using a sampling tool of the present disclosure.
Figure 8:
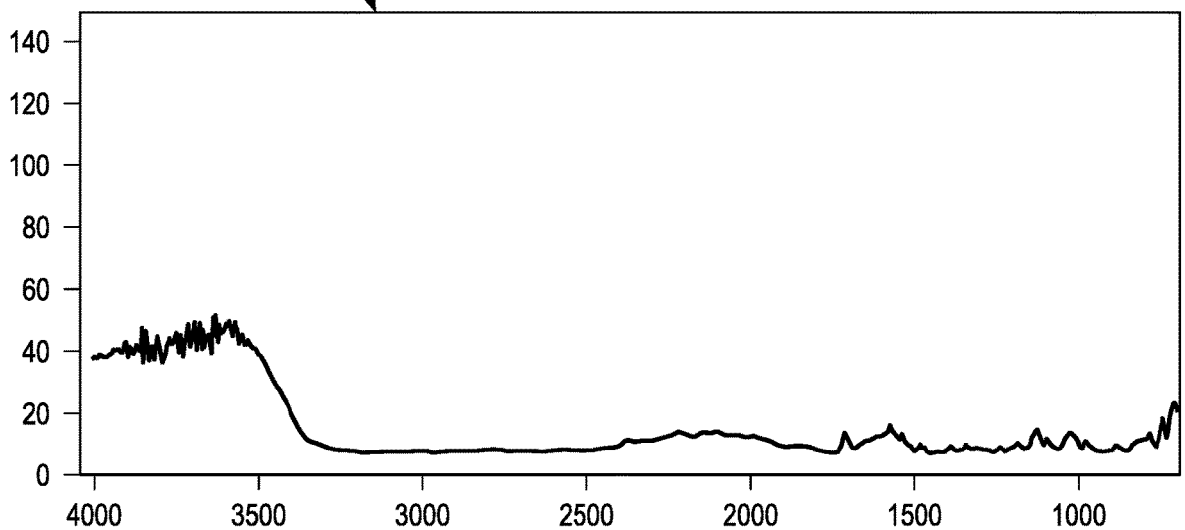
Figure 8:
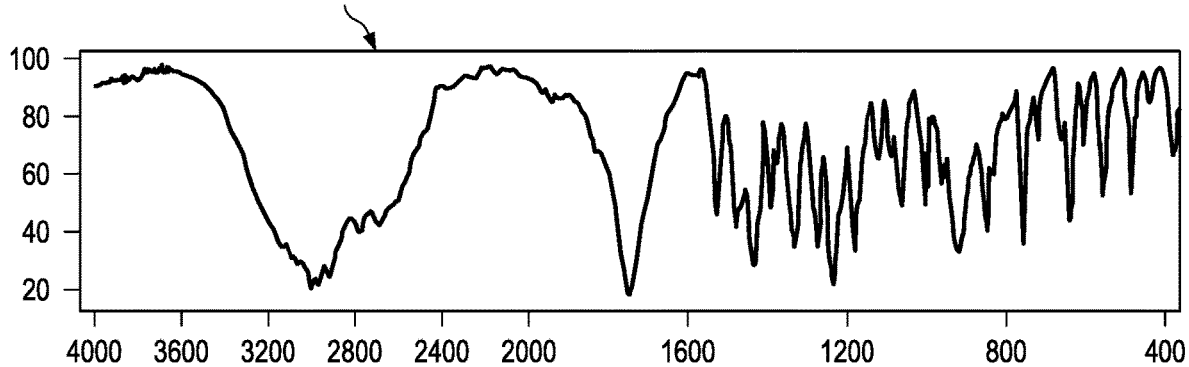

FIG. 8 compares reflectance spectra of ibuprofen resulting from various sample preparation methods. FIG. 8 comprises graphs 810, 820, 830 with x-axes representing wavelength in $cm^{-1}$ and y-axes representing reflectance R. The graph 810 is a reflectance spectrum of an ibuprofen powder using the method 500 and thus a sample with a thickness of about 220 μm, the graph 820 is a reflectance spectrum of an ibuprofen powder using a method that produces a sample with a thickness of about 500 μm, and the graph 830 is a transmission reference spectrum of pellet ibuprofen as a reference. For the graph 830, the pellet is a combination of likely about 1%-10% ibuprofen and likely about 90%-99% potassium bromide, which is a salt.

Both the graph 810 and the graph 820 demonstrate noise above wavelengths of about 3,500 $cm^{-1}$ due to fluctuations in atmospheric water concentrations. Purging the instrument with dry air could remove that noise. In the graph 820, reflectance below wavelengths of about 3,500 $cm^{-1}$ is almost 0, so the graph 820 is not useful. The graph 830 comprises a first scale between wavelengths of about 4,000 $cm^{-1}$ and 2,000 $cm^{-1}$ and a second scale between wavelengths of about 2,000 $cm^{-1}$ and 400 $cm^{-1}$, so the peaks of the graph 830 do not line up with the peaks of the graph 810. Thus, compared to the graph 820, the graph 810 provides a reflectance spectrum that better demonstrates the structure of the sample.

FIGS. 6-8 demonstrate that the method 500 produces results similar to reference results. In addition, the method 500 is simpler because it does not require melting to create a film like the clear polystyrene film represented in the graph 630, dilution to create the diluted montmorillonite clay represented in the graph 730, or pelletization like the pellet ibuprofen represented in the graph 830. Finally, the method 500 does not yield broad spectra peaks, inaccurate relative peak intensities, and inaccurately low reflectances like for the thicker samples represented in the graphs 620, 720, 820.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A sampling tool for use with a spectrophotometer, the sampling tool comprising:
   a bottom plate that is solid; and
   a mesh attached to the bottom plate, the mesh having a plurality of interstitial spaces, and the mesh having a mesh width and a mesh thickness extending from an upper surface of the bottom plate to a top surface of the mesh,
   wherein the mesh is configured to receive a sample material and retain a portion of the sample material within the interstitial spaces to form a sample having a sample thickness which is substantially the same as the mesh thickness,
   wherein the mesh width is sized to be in a range of about 1 to 3 times a width of an infrared beam directed toward the sampling tool from the spectrophotometer, and
   wherein the bottom plate comprises no openings in an area of the bottom plate extending directly below the mesh.

2. The sampling tool of claim 1, wherein the bottom plate is sized and configured to be attached to a sampling tool support of the spectrophotometer.

3. The sampling tool of claim 1, wherein the bottom plate is sized and configured to be held in a sampling tool carrier for insertion into the spectrophotometer.

4. The sampling tool of claim 1, wherein the width of the infrared beam is in a range of about 1 millimeter (mm) to about 13 mm.

5. The sampling tool of claim 1, wherein the width of the infrared beam is in a range of about 1.5 mm to about 7 mm.

6. The sampling tool of claim 1, wherein the mesh is substantially round and has a diameter in a range of about 1 mm to about 39 mm.

7. The sampling tool of claim 1, wherein the mesh comprises interwoven wires, each wire having a wire diameter, and wherein the mesh thickness is about twice the wire diameter.

8. The sampling tool of claim 7, wherein the wire diameter is in a range of about 50 micrometers (μm) to about 150 μm.

9. The sampling tool of claim 1, wherein the mesh comprises stainless steel wire.

10. The sampling tool of claim 1, wherein the mesh is attached to the bottom plate by spot welding or solder.

11. The sampling tool of claim 1, wherein the bottom plate is constructed of stainless steel.

12. The sampling tool of claim 1, wherein the mesh thickness is in a range of about 50 micrometers (μm) to about 300 μm.

13. The sampling tool of claim 1, wherein the bottom plate is round, has a plate thickness in a range of about 100 micrometers (μm) to about 500 μm, and has a plate diameter in a range of about 10 millimeters (mm) to about 50 mm.

14. The sampling tool of claim 1, wherein the bottom plate is configured to reflect light passing through the sample.

15. The sampling tool of claim 14, wherein the bottom plate is configured to prevent transmission of the light.

16. A method of infrared spectroscopy, the method comprising:
    obtaining a sampling tool comprising:
       a bottom plate that is solid; and
       a mesh attached to the bottom plate, the mesh having a plurality of interstitial spaces, and the mesh having a mesh width and a mesh thickness extending from an upper surface of the bottom plate to a top surface of the mesh,
       wherein the mesh is configured to receive a sample material and retain a portion of the sample material within the interstitial spaces to form a sample having a sample thickness which is substantially the same as the mesh thickness,
       wherein the mesh width is sized to be in a range of about 1 to 3 times a width of an infrared beam directed toward the sampling tool from a spectrophotometer, and
       wherein the bottom plate comprises no openings in an area of the bottom plate extending directly below the mesh;
    disposing the sample material into the mesh of the sampling tool to form the sample in the sampling tool; and
    performing an infrared spectroscopy analysis on the sample in the sampling tool.

17. The method of claim 16, further comprising inserting the sampling tool into the spectrophotometer for performing the infrared spectroscopy analysis on the sample.

18. The method of claim 16, wherein the sample is a neat sample and comprises no diluent.

19. The method of claim 16, further comprising further performing the infrared spectroscopy analysis by:
    causing a light to emit towards the sample and reflect as a reflected portion; and
    determining an amount of the reflected portion.

20. The method of claim 19, wherein the infrared spectroscopy analysis is independent of a transmitted portion of the light that transmits through the sample.

* * * * *